United States Patent
Mahfoudh et al.

(10) Patent No.: US 8,196,254 B2
(45) Date of Patent: Jun. 12, 2012

(54) DEVICE FOR CONNECTING A WIPER BLADE TO A WIPER ARM OF A WINDSHIELD WIPER IN AN ARTICULATED MANNER

(75) Inventors: Samir Mahfoudh, Buehl (DE); Wolfgang Leutsch, Buehlertal (DE); Hubert Verelst, Tienen (BE); Erik Kinnaert, Tienen (BE)

(73) Assignee: Robert Bosch GmbH, Stuttgart (DE)

( * ) Notice: Subject to any disclaimer, the term of this patent is extended or adjusted under 35 U.S.C. 154(b) by 1166 days.

(21) Appl. No.: 11/915,856

(22) PCT Filed: Apr. 21, 2006

(86) PCT No.: PCT/EP2006/061757
§ 371 (c)(1),
(2), (4) Date: Nov. 29, 2007

(87) PCT Pub. No.: WO2006/128763
PCT Pub. Date: Dec. 7, 2006

(65) Prior Publication Data
US 2008/0256739 A1     Oct. 23, 2008

(30) Foreign Application Priority Data
Jun. 1, 2005   (DE) .................. 10 2005 025 542

(51) Int. Cl.
*B60S 1/34* (2006.01)
*B60S 1/40* (2006.01)

(52) U.S. Cl. ................ 15/250.32; 15/250.351

(58) Field of Classification Search ........... 15/250.32, 15/250.351, 250.43, 250.44, 250.361, 250.201
See application file for complete search history.

(56) References Cited

U.S. PATENT DOCUMENTS

| | | | |
|---|---|---|---|
| 6,481,044 B1 * | 11/2002 | Journee ............... | 15/250.32 |
| 6,654,983 B1 * | 12/2003 | Raynaud ............... | 15/250.32 |
| 7,690,074 B2 * | 4/2010 | Ostrowski ............ | 15/250.32 |

(Continued)

FOREIGN PATENT DOCUMENTS

DE      1123579        2/1962
(Continued)

OTHER PUBLICATIONS

PCT/EP2006/061757 International Search Report.

*Primary Examiner* — Gary Graham
(74) *Attorney, Agent, or Firm* — Michael Best & Friedrich LLP

(57) ABSTRACT

The invention relates to a device (20) for connecting a wiper blade (12) to a wiper arm (10) of a windshield wiper in an articulated manner, which comprises a joining element (38), which is joined in a fixed manner to the wiper arm (10), and a connecting element (22), which is joined in a fixed manner to a supporting element (16) of the wiper blade (12) and on which a plastic adapter (30) is pivotally mounted. The adapter (30) is fixed in the profile of the joining element (38), said profile being open toward the connecting element (22), by means of fastening means (34, 40). The invention provides that a filler piece (44) is placed in the joining element (38) on the side facing the wiper arm (10) following the adapter (30). Said filler piece rests tightly against the inside walls of the joining element (38) and against the adjacent face of the adapter (30).

14 Claims, 4 Drawing Sheets

U.S. PATENT DOCUMENTS

2005/0217057 A1 * 10/2005 Kagawa et al. .......... 15/250.351

FOREIGN PATENT DOCUMENTS

| | | |
|---|---|---|
| DE | 3709810 A1 | 10/1988 |
| DE | 202004012547 U1 | 11/2004 |
| DE | 10347637 A1 | 5/2005 |
| WO | 02/40328 A1 | 5/2002 |
| WO | 2004/028875 * | 4/2004 |
| WO | 2004/098962 A1 | 11/2004 |

* cited by examiner

DEVICE FOR CONNECTING A WIPER BLADE TO A WIPER ARM OF A WINDSHIELD WIPER IN AN ARTICULATED MANNER

BACKGROUND OF THE INVENTION

The invention starts from a device for the articulated connection of a wiper blade to a wiper arm of a windshield wiper.

This type of device is known from WO 02/40328 A1. It includes a connecting piece in the form a sheet metal claw, an adapter made of plastic and a connecting element firmly connected to the wiper arm. The connecting piece is fastened on a supporting element of the wiper blade in the form of two parallel spring rails via claws and/or welding. It has a U-shaped cross-sectional profile, wherein, starting from a base part adjacent to the supporting element, side walls are bent away from the supporting element by approx. 90°. Openings are provided in the side walls, into which a bearing bolt is inserted in a rotationally secured manner. The adapter, which is guided laterally between the side walls of the connecting piece, is pivoted on said bearing bolt with a nub. The adapter has locking means and holding means, with which it is clipped into the profile of the connecting element that is open towards the wiper blade. In the mounted position, the connecting element overlaps both the adapter as well as the side walls of the connecting piece from the outside. In a relative movement between the wiper arm and the wiper blade during a wiping process, there can be contact between the inner side of the connecting element and the outer side of the connecting piece. Since these two parts are fabricated of metal as a rule, increased friction is generated in the process, whereby the corrosive protection can also be damaged.

A similar device for the articulated connection of a wiper blade to a wiper arm is known from DE 103 47 637 A1. In this case, the connecting piece has, in the form of a sheet metal claw, a guide web running in the longitudinal direction, which points away from the supporting element of the wiper blade and into which a crosswise running swivel axis is inserted in a rotationally secured manner. The adapter having bearing openings that are arranged in lateral flexible tongues is pivoted on the swivel axis that projects cantilevered on both sides of the longitudinal web. The adapter, which is fabricated of plastic, clasps the sheet metal claws from the outside and is clipped into the connecting element that is open towards the wiper blade by means of locking elements and holding elements. The connecting element is firmly connected to the wiper arm. The adapter is for one guided laterally onto the sheet metal claw by inner guide webs and secondly inserted on its side walls into the connecting element free of play. As a result, the adapter made of plastic decouples the connecting element from the connecting piece, thereby guaranteeing good corrosion resistance and low friction losses.

Due to the openings and gaps between the connecting piece, the adapter and the connecting element, splashed water and rain are pressed into the connector device during operation of the windshield wiper under the high pressure of the air stream. The water collected in the connecting piece is suctioned out of the connector device by the partial vacuum, in particular behind a spoiler, and flung via the flow during the upwards movement onto the already cleaned wiper field. This process is called overspray or water overspray and is considered annoying.

SUMMARY OF THE INVENTION

According to the invention, a filler piece is arranged in the connecting element on the side facing the wiper arm, which makes sure that the air stream does not press splashed water and rain into the gap and cavities of the device, particularly if the air stream during wiper movement of the windshield has an appreciable component in the longitudinal direction of the wiper blade. An improvement of the effect is achieved if the filler piece is arranged following the adapter and tightly abuts the inner walls of the connecting element and/or the adjacent front side of the adapter. So that water cannot penetrate into the device along the wiper blade, particularly if a spoiler is provided, according to an embodiment of the invention, a bulkhead wall that runs transverse to the wiper blade is provided on the drive side of the connecting piece, which bulkhead wall engages in a slot of the filler piece with little play. The water that flows along the wiper arm and the spoiler in the direction of the device is diverted to the vehicle window at the bulkhead wall so that it cannot collect in the device. Due to the measures in accordance with the invention, considerably fewer wiping cycles are required to attain a drip-free vehicle window when rain or splashed water stops. It is obvious that the bulkhead wall creates an appreciable effect even without the filler piece and therefore can also be used for wiper blades that are supposed to be connected to wiper arms without filler pieces.

Another embodiment of the invention provides for the filler piece to be adjacent with at least one rim to an edge on the open side of the connecting element. Furthermore, another embodiment provides for the front side of the adapter that is adjacent to the filler piece to engage in an overlapping manner in recesses on the front side of the filler piece. The seal between the filler piece and the adjacent components is improved because of the multiple diversions at the transitions of the components.

The filler piece extends from the adapter a bit into the connecting element, which is fastened or formed on the free end of the wiper arm. If the connecting element is laterally offset so that the wiper blade runs approximately laterally parallel to the wiper arm, the filler piece will expediently fill out at least the area of the offset.

BRIEF DESCRIPTION OF THE DRAWINGS

Additional advantages are yielded from the following description of the drawings. An exemplary embodiment of the invention is depicted in the drawings. The drawings, the description and the claims contain numerous features in combination. The person skilled in the art will also observe individual features expediently and combine them into additional, meaningful combinations.

The drawings show.

DETAILED DESCRIPTION

Figure 1:
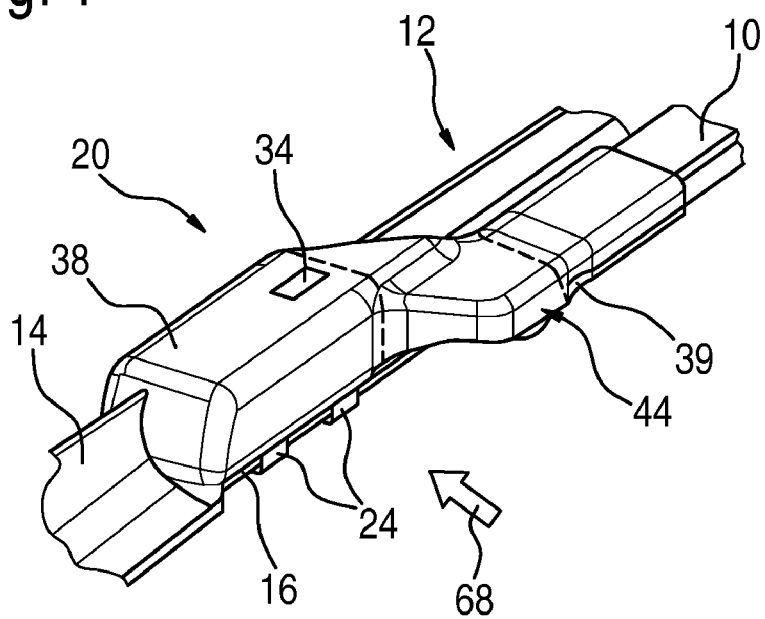
FIG. 1 A perspective partial view from above of a device in accordance with the invention, FIG. 2 A perspective representation of a filler piece, FIG. 3 A perspective side view of a wiper blade with an adapter, but without a connecting element, FIG. 4 A view of a connecting element from below, FIG. 5 A perspective representation of a device in accordance with the invention with a folded-out connecting element.

A wiper arm 10 is connected in an articulated manner via a device 20 to a wiper blade 12, which includes two supporting elements 16 inserted laterally in a wiper strip 18 and a spoiler 14. The supporting elements 16 have the form of flat spring rails, which are pre-bent in the longitudinal direction such that the wiper strip 18 is adjacent to a vehicle window under the force of a wiper arm 10 in the longitudinal direction with a favorable distribution of pressure.

The device 20 includes a connecting piece 22, which is fastened on the supporting elements 16 with claws 24. In addition or instead of the claws 24, the connecting piece 22 can be connected to the supporting elements 16 by welding. The connecting piece 22 has a guide web 26 running in the longitudinal direction, which has a joint hub 28 for a joint axis (not shown), on which an adapter 30 is pivoted. This adapter has guide profiles 32, with which it is guided laterally vis-à-vis the guide web 26 and a connecting element 38. The adapter 30 is detachably connected via fastening means 40 to the connecting element 38, which for its part is fastened or formed on the free end of the wiper arm 10. The adapter 30 has a button 34 on its upper side, which is attached to the adapter 30 via a flexible tongue 36 and in a mounted position locks into place in an opening 42 of the connecting element 38. The adapter 30 is fixed in the longitudinal direction relative to the connecting element 38 by the button 34.

In the depicted embodiment (FIG. 1) in the inflow direction 68 of the air stream, the wiper arm 10 runs in front of the wiper blade 12 and approximately parallel thereto. As a result, the connecting element 38 is correspondingly laterally offset. Since the wiper arm 10 is a shorter distance from the vehicle window than the upper side of the connecting element 38, a step 39 is produced in the progression of the connecting element 38, which step runs approximately parallel to the wiper arm 10. A filler piece 44 is arranged following the adapter 30 in the offset area, and the filler piece tightly abuts the inner walls of the connecting element 38 and the facing front side of the adapter 30. The position of the filler piece 44 is indicated in FIG. 1 with a dashed line. It fills out the hollow space the adapter 30 and the end of the wiper arm 10 that is designed as a wiper rod and has a step 56 that is analogous to the step 39 of the connecting element 38. If the connecting element 38 is formed on the wiper arm 10, it is expedient for the filler piece 44 to project so far into the wiper arm 10 that the water that is flowing along it is deflected to the vehicle window at some distance from the device 20 by the filler piece 44.

Figure 2:
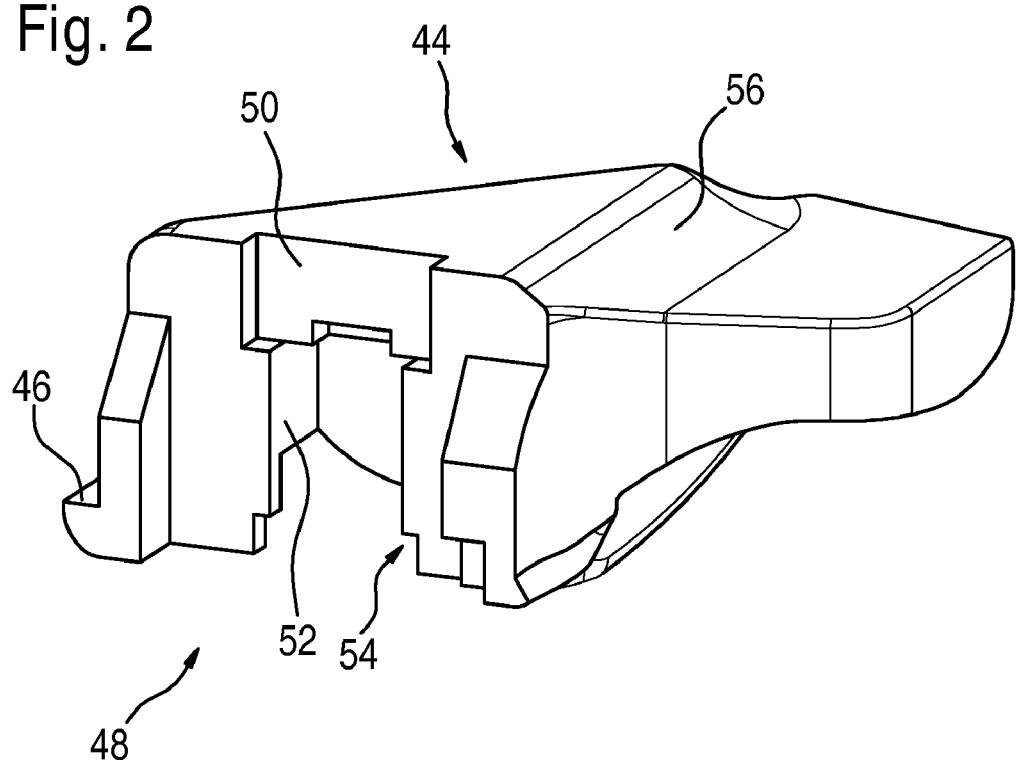

To better seal the filler piece 44 against the connecting element 38, the filler piece 44 has a rim 46, which at least partially covers a lower edge 47 of the connecting element 38. Furthermore, the filler piece 44 has recesses 50 and 52 on its front side 48 toward the adapter 30 into which the adjacent parts of the adapter 30, e.g., the button 34 and the guide profile 32, engage in an overlapping manner and thereby form a tight connection. Another recess 54 is provided on the lower side of the filler piece 44 for the upper part of the wiper strip 18 (FIG. 2).

Figure 3:
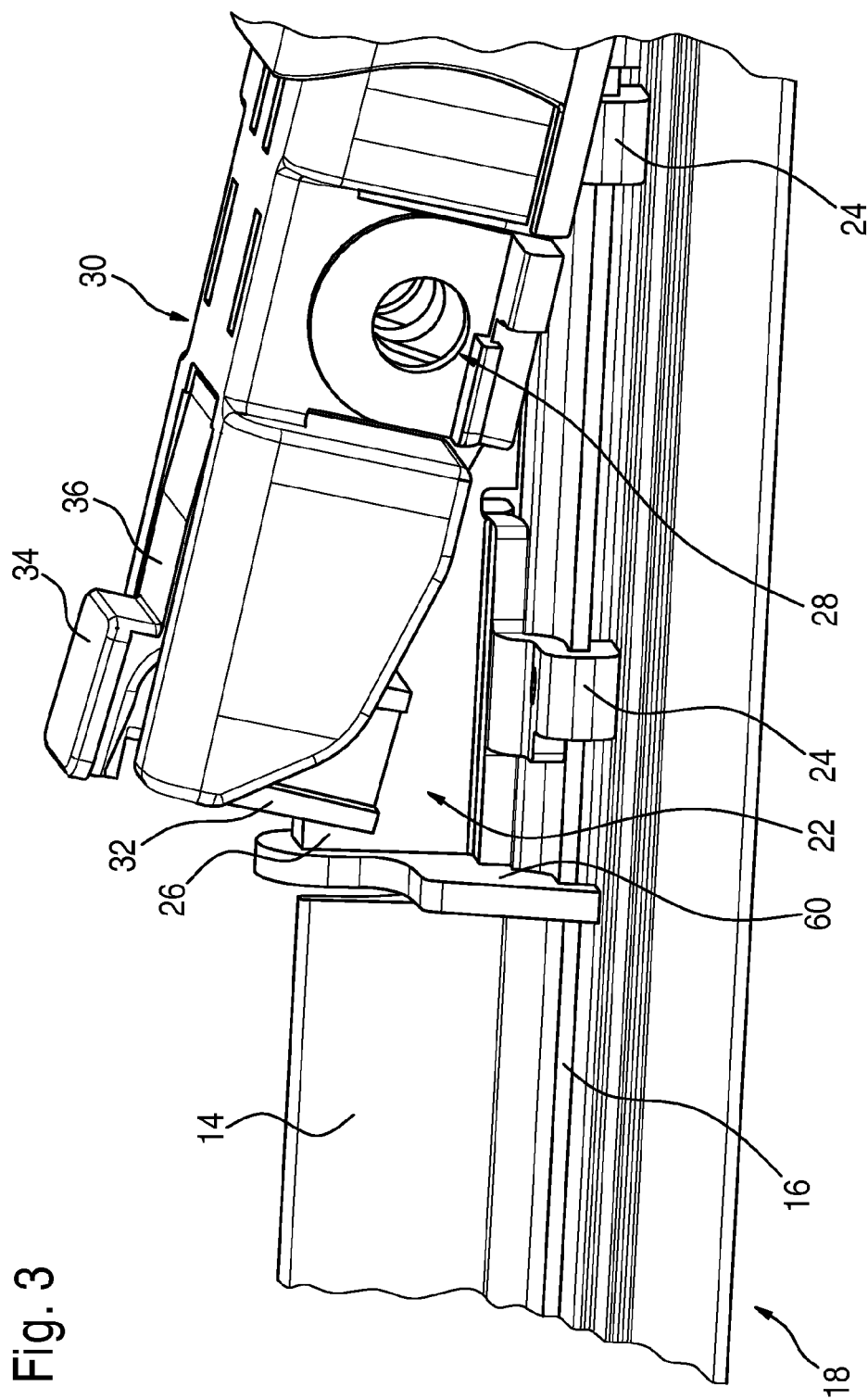
Figure 4:
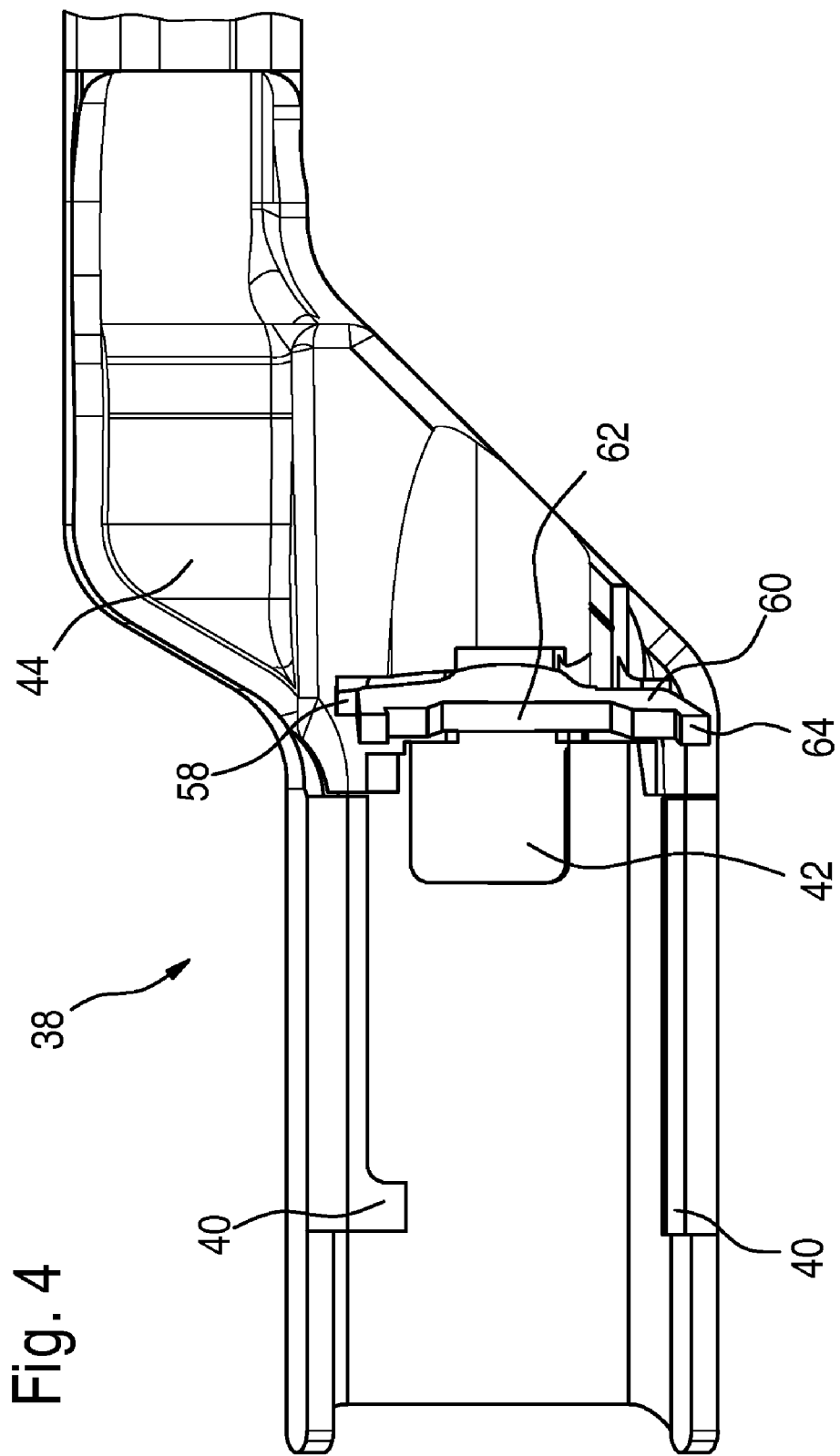
Figure 5:
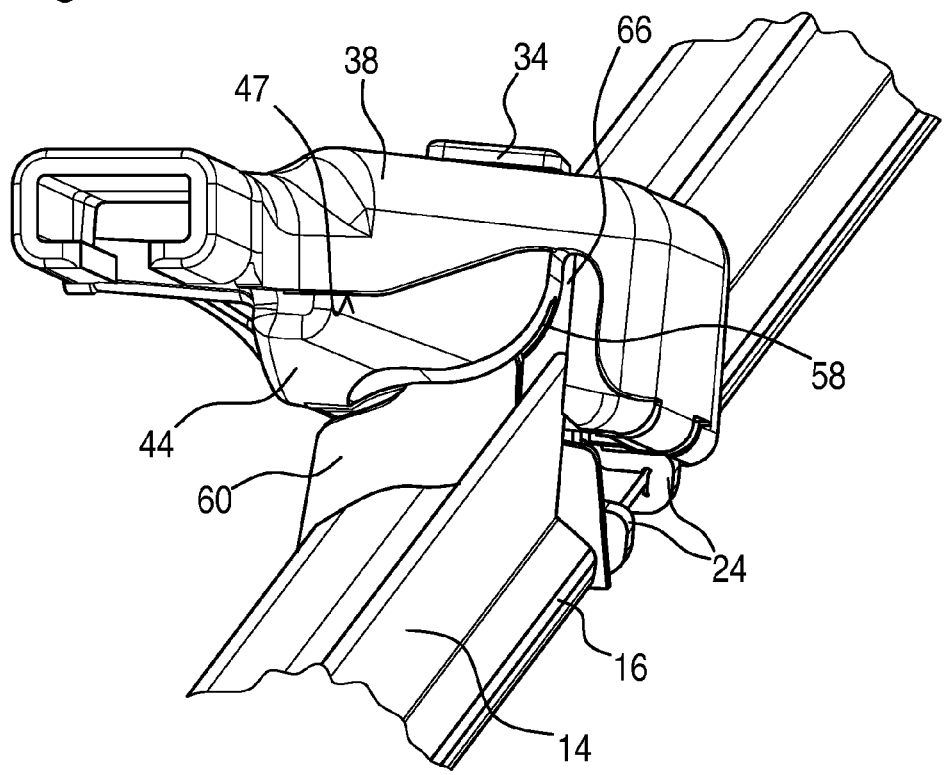

To prevent water that is flowing in the longitudinal direction of the wiper blade 12 or the wiper arm 10 from penetrating into the device 20 and collecting there, a bulkhead wall 60 is arranged on the wiper blade 12 transverse to the longitudinal direction and is fastened with claws 64 to the supporting elements 16 (FIG. 3). The bulkhead wall 60 has a recess 62 towards the wiper strip 18, which tightly abuts the upper part of the wiper strip 18 (FIG. 4). The bulkhead wall 60 engages with little play in a slot 58 of the filler piece 44 (FIG. 5) so that any flow in the longitudinal direction is effectively interrupted. This is particularly expedient if the wiper blade 10 has a spoiler 14, via which as a rule more water is transported in the longitudinal direction of the wiper blade 12. A window is provided in the spoiler 14 in the area of the connecting piece 22. On both sides of the window, the spoiler 14 projects into a connecting profile 66 of the filler piece 44 and of the connecting element 38.

The invention claimed is:

1. Device (20) for the articulated connection of a wiper blade (12) to a wiper arm (10) of a windshield wiper, the device comprising a connecting element (38), which can be connected to a connecting piece (22) of the wiper blade (12) and which has a profile that is open towards the connecting piece (22), characterized in that a filler piece (44) is arranged in the connecting element (38) on a side facing the wiper arm (10), which filler piece tightly abuts inner walls of the connecting element (38), and characterized in that an adapter (30) is fixed against pivotal and translational movement relative to the connecting element via fastening means (34, 40) in the profile of the connecting element (38) that is open towards the connecting piece (22), and the adapter can be pivoted on the connecting piece (22), and wherein the filler piece (44) is arranged following the adapter (30) and tightly abuts an adjacent face of the adapter (30).

2. Device (20) according to claim 1, characterized in that the filler piece (44) is adjacent with at least one rim (46) to an edge (47) on the open side of the connecting element (38).

3. Device (20) according to claim 1, characterized in that the face of the adapter (30) that is adjacent to the filler piece (44) engages in an overlapping manner in recesses (50, 52, 54) on an adjacent face (48) of the filler piece (44).

4. Device (20) according to claim 1, characterized in that a bulkhead wall (60) that runs transverse to a longitudinal axis of the wiper blade (12) is provided on a drive side of the connecting piece (22), which bulkhead wall engages in a slot (58) of the filler piece (44) with little play.

5. Device (20) for the articulated connection of a wiper blade (12) to a wiper arm (10) of a windshield wiper, the device comprising a connecting element (38), which can be connected to a connecting piece (22) of the wiper blade (12) and which has a profile that is open towards the connecting piece (22), characterized in that a filler piece (44) is arranged in the connecting element (38) on a side facing the wiper arm (10), which filler piece tightly abuts inner walls of the connecting element (38), and wherein a bulkhead wall (60) that runs transverse to a longitudinal axis of the wiper blade (12) is provided on a drive side of the connecting piece (22), which bulkhead wall engages in a slot (58) of the filler piece (44) with little play.

6. Device (20) according to claim 5, characterized in that an adapter (30) is fixed via fastening means (34, 40) in the profile of the connecting element (38) that is open towards the connecting piece (22) and the filler piece (44) is arranged following the adapter (30) and tightly abuts an adjacent face of the adapter (30), wherein the adapter can be pivoted on the connecting piece.

7. Device (20) according to claim 6, characterized in that the face of the adapter (30) that is adjacent to the filler piece (44) engages in an overlapping manner in recesses (50, 52, 54) on an adjacent face (48) of the filler piece (44).

8. Device (20) according to claim 5, characterized in that the filler piece (44) is adjacent with at least one rim (46) to an edge (47) on the open side of the connecting element (38).

9. Device (20) for the articulated connection of a wiper blade (12) to a wiper arm (10) of a windshield wiper, the device comprising a connecting element (38), which can be connected to a connecting piece (22) of the wiper blade (12) and which has a profile that is open towards the connecting piece (22), characterized in that a filler piece (44) is arranged in the connecting element (38) on a side facing the wiper arm (10), which filler piece tightly abuts inner walls of the connecting element (38), and characterized in that an adapter (30) is fixed in the profile of the connecting element (38) that is open towards the connecting piece (22), the adapter being in end-to-end relationship with the filler piece, wherein the adapter can be pivoted on the connecting piece (22), and wherein the adapter (30) is fixed via fastening means (34, 40) in the profile of the connecting element (38) that is open towards the connecting piece (22) and the filler piece (44) is arranged following the adapter (30) and tightly abuts an adjacent face of the adapter (30).

10. Device according to claim 9 wherein the adapter is fixed to the connecting element via fastening means (34, 40).

11. Device according to claim 9 wherein the adapter is fixed against pivotal and translational movement relative to the connecting element via fastening means (34, 40).

12. Device (20) according to claim 9, characterized in that the filler piece (44) is adjacent with at least one rim (46) to an edge (47) on the open side of the connecting element (38).

13. Device (20) according to claim 9, characterized in that the face of the adapter (30) that is adjacent to the filler piece (44) engages in an overlapping manner in recesses (50, 52, 54) on an adjacent face (48) of the filler piece (44).

14. Device (20) according to claim 9, characterized in that a bulkhead wall (60) that runs transverse to a longitudinal axis of the wiper blade (12) is provided on a drive side of the connecting piece (22), which bulkhead wall engages in a slot (58) of the filler piece (44) with little play.

* * * * *